United States Patent [19]

Baker

[11] 4,167,699

[45] Sep. 11, 1979

[54] USER CALIBRATED ELECTRONIC SPEEDOMETER AND ODOMETER

[75] Inventor: John D. Baker, Lisle, Ill.

[73] Assignee: Stewart-Warner Corporation, Chicago, Ill.

[21] Appl. No.: 781,205

[22] Filed: Mar. 25, 1977

[51] Int. Cl.² ............................................. G01P 21/02
[52] U.S. Cl. .................................... 324/171; 324/166
[58] Field of Search ................ 324/171, 160, 166, 168, 324/173, 174, 175

[56] References Cited

U.S. PATENT DOCUMENTS

| 3,739,270 | 6/1973 | Miller et al. | 324/171 |
| 3,946,311 | 3/1976 | Baker et al. | 324/167 |
| 4,074,196 | 2/1978 | Webster | 324/171 |

Primary Examiner—Robert J. Corcoran
Attorney, Agent, or Firm—McDougall, Hersh & Scott

[57] ABSTRACT

A circuit is disclosed for driving an electronic speedometer (or tachometer) and an associated odometer of the type suitable for use in automobiles, trucks and tractors. The circuit includes a programmable divider which can be user calibrated so that a change in a system parameter, such as tire size, can be accommodated. The circuit employs a pulse generator producing timing pulses for a magnetically driven air core gauge. The timing pulses are produced in response to pulses indicative of the remote condition being sensed as, for example, wheel rotation or engine speed.

10 Claims, 7 Drawing Figures

PROGRAMMABLE DIVIDER

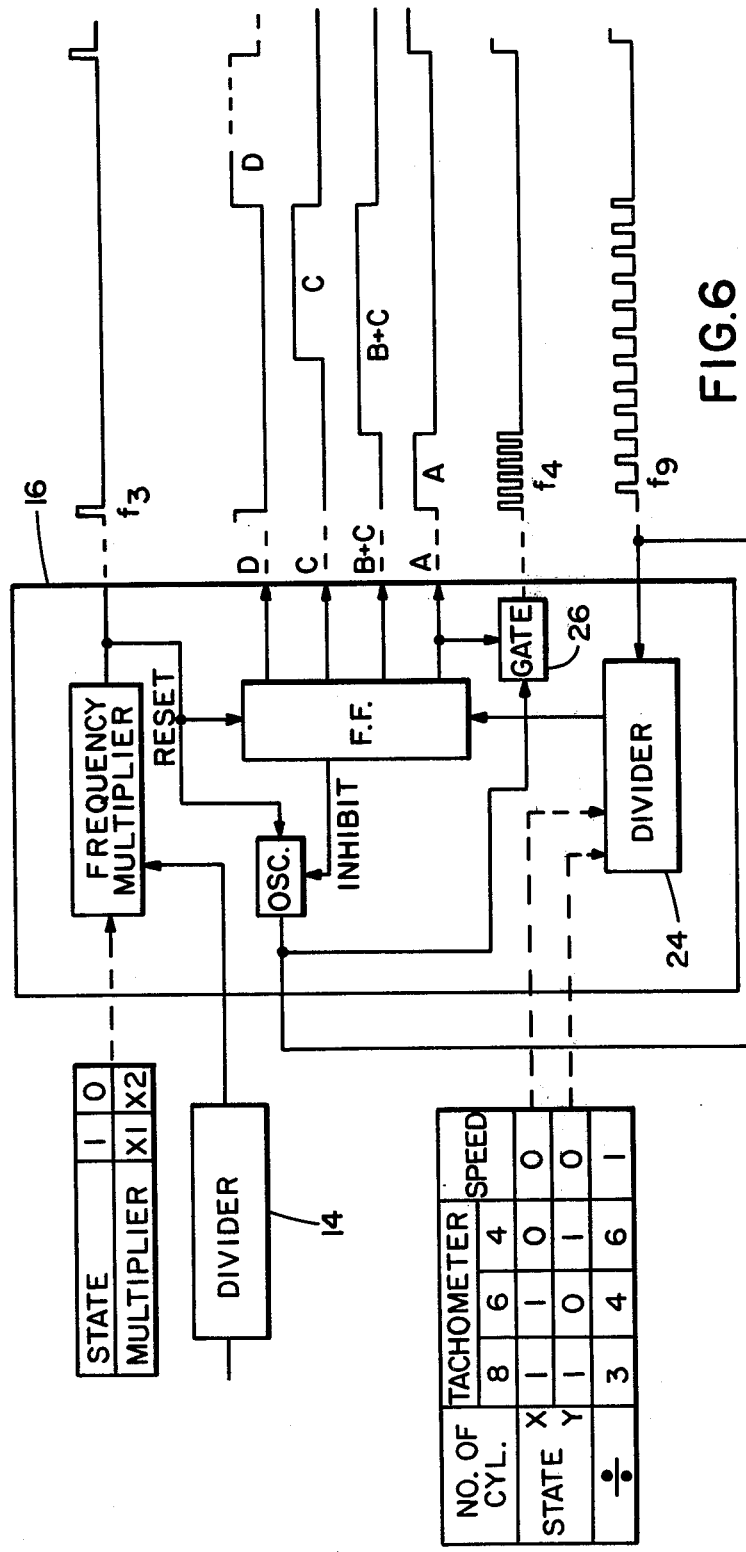
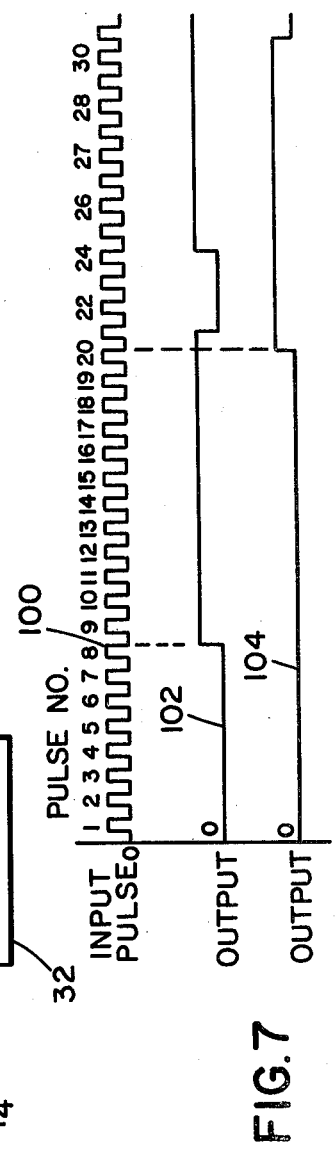
FIG.6
FIG.7

USER CALIBRATED ELECTRONIC SPEEDOMETER AND ODOMETER

BACKGROUND OF THE INVENTION

This invention relates to the field of measuring devices. More particularly, it relates to circuits for controlling display gauges, such as those utilized for displaying engine speed (tachometers), ground speed (speedometers), and distance travelled (odometers). Typically, such gauges are required on motor vehicles including passenger cars, trucks and tractors. Such gauges are important, particularly for trucks and tractors, where lease rates, service intervals and the like are dependent upon mileage while tractors must precisely monitor their ground speed to assure accurate placement of seeds during plowing.

Such devices, of course, are old in the art and have been primarily of the mechanical variety. For example, speedometers employ a cable attached to the wheel hub and the rotation of the cable is indicative of speed when a proper calibration is effected. More recently, electromechanical and electronic meters have come into use whereby an improvement in accuracy and dependability can be obtained. One such system is disclosed in U.S. Pat. No. 3,946,311 to Baker et al, assigned to the present assignee and hereby incorporated by reference. That patent discloses an air core gauge of the magnetic type in which the display gauge is driven by energizing a pair of electromagnetic coils for moving a pointer around a calibrated dial. The amount of angular displacement of the pointer is controlled by the amount of current flowing through the magnetic coils which are positioned at 90° relative to each other. That patent discloses a method of obtaining an expanded pointer range by utilizing an electronic pulsing circuit for providing a time varying current flow through the magnetic coils in a manner so as to permit movement of the pointer through substantially 270° of arc.

The present invention, as will be indicated in the descriptive portion of this specification, employs the pulse generating circuit disclosed in the referenced patent. The present invention, however, further discloses the concurrent operation of an odometer from the same circuitry and the capability for providing a user calibrated system.

In the past a substantial problem has existed with trucks and tractors when the gearing was changed as, for example, when a truck is in overdrive or when the tire size of a vehicle changes. Electronic measuring devices typically receive their input signals as a series of pulses from the wheel or drive shaft depending upon the condition being sensed. Changing the gear ratio of the final drive of a truck or changing the tire size on the wheels of the vehicle alters the calibration of the speedometer and odometer rendering them inaccurate until re-calibrated. Presently, regardless of the type of instrument employed, re-calibration has been an expensive and time consuming process whereby a skilled mechanic is required to adjust the device for the new operating parameters of tire size or gear ratio. Further, with respect to the overdrive gears present on many truck transmissions, it has been completely impossible to compensate for the use of a gear ratio of this type since it is employed only at highway speeds when constant driving conditions are likely to be encountered.

The present invention provides, in the several embodiments, the capability of solving these problems in an elegant manner. With respect to the re-calibration necessary for tire size changes and the like, a programmable divider is included in the pulse generating circuitry which can be programmed simply by inserting a properly coded key element into a receptacle. The coded key selects the dividing ratio of the programmable divider to account for changes in the condition to be measured. With respect to the truck overdrive problem, a simple circuit is provided which detects the occurrence of overdrive and switches the divider between two preselected operating modes, each of which is accurate for a given set of conditions. Re-calibration of the speedometer is automatically effective, according to the invention, for re-calibrating the odometer circuitry.

In another embodiment of the invention a form of the circuit is disclosed suitable for use in passenger automobiles where no changes in the measured parameters need be anticipated. In that embodiment a programmable divider is unnecessary and the pulse generating circuit is utilized for simultaneously driving the speedometer or tachometer and an associated odometer.

It is accordingly an object of the present invention to provide a user calibrated circuit for measuring a remote parameter, such as speed.

It is another object of the present invention to provide an electronic control circuit for driving a speedometer and odometer which circuit can be readily re-calibrated.

It is a further object of the present invention to provide an electronic control circuit which includes a programmable divider which can be set by a user to a selected value depending upon the application.

Other objects and advantages of the invention will be apparent from the remaining portion of the specification.

BRIEF DESCRIPTION OF THE DRAWINGS

FIG. 4 is a third embodiment of the invention in which the programmable divider is switch selectable to accommodate changes in tire size and the like.

FIG. 6 is a combined schematic waveform diagram illustrating the timing relationship of the various pulse signals generated by the circuit according to the invention.

FIG. 7 is a timing diagram of the signals produced by the programmable divider useful in understanding the operation thereof.

DETAILED DESCRIPTION

Figure 1:
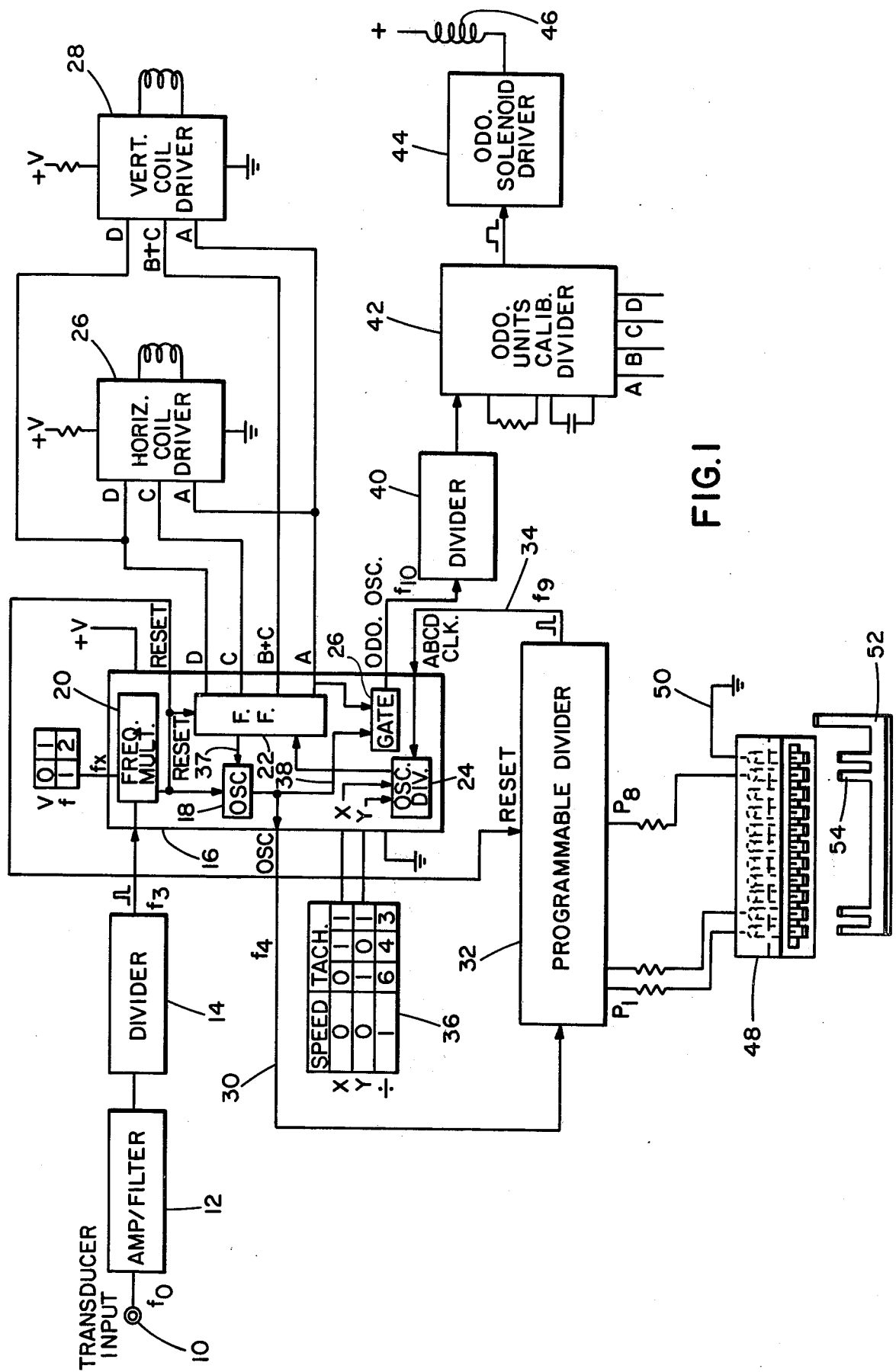
FIG. 1 is a block diagram of a circuit according to a first embodiment of the invention employing a user programmable divider which is programmed according to the pins selected on a mechanical key.

Referring to FIG. 1, the invention according to a first and preferred embodiment is illustrated. A transducer input is applied to terminal 10 from the remote condition being sensed. If engine speed is being sensed a series of pulses are applied to terminal 10 from a transducer associated with the drive shaft. If vehicle speed is being sensed a series of pulses are provided to terminal 10 from a transducer located on the wheel of the vehicle or other location proportional to vehicle speed. The signals applied to terminal 10 are amplified and filtered by conventional circuits indicated at 12. The frequency of received pulses is proportional to the condition being monitored so that as speed increases, for example, the number of pulses received at terminal 10 will proportionately increase. In some applications the number of pulses received is greater than desired for use in the invention. Accordingly, a divider stage 14 is provided whereby the number of pulses is divided by some integer. The pulse signals are then applied to a control signal generator 16. The control signal generator is a complex circuit which preferably, is fabricated as a custom integrated circuit. The detailed circuitry of the pulse generator 16 is fully disclosed in U.S. Pat. No. 3,946,311 hereby incorporated by reference. Specifically, FIGS. 8 and 9 of that patent and the corresponding portion of the specification describe circuit 16 in detail.

For the purpose of the present invention the functional sub-circuits of the control signal generator are indicated in block form. These include an oscillator 18 whose oscillation frequency is controlled by the selected values of the externally coupled timing resistor and capacitor. A frequency multiplier 20 is provided which receives the signal from divider 14 and depending upon the state of pin fx the incoming signal is multiplied by one or by two. This capability is provided for applications where it is desired to increase the frequency of the incoming signal. A typical situation where this would be desirable is for very low speed monitoring as, for example, monitoring the plowing speed of a tractor. When the frequency multiplier external pin fx is connected to ground it doubles the incoming pulse by triggering off the leading and trailing edge thereof. When the pin fx is not grounded the circuit 16 triggers only off the leading edge of the incoming pulse.

Integrated circuit 16 also includes a set of flip flops and associated logic gates 22, a selectable oscillator divider 24 and an oscillator gate 26. The output from the flip flops 22 are a series of pulses designated A, B+C, C, and D. These pulses are applied to the driver circuits for the magnetic coils of the speedometer gauge for the purpose of deflecting he pointer by a selected amount. As indicated in FIG. 1, signals D, C and A are applied to the horizontal coil driver 26 while pulses D, B+C, and A are provided to the vertical coil driver 28. For additional information with respect to operation of the driver circuits and the air core gauge reference is again made to the cited U.S. patent and particularly FIGS. 6 and 8 thereof where several embodiments of coil driver circuits are disclosed operating off of the pulses just described.

The pulses produced at the output of the divider 14, hereinafter designated f3 pulses, are applied through the frequency multiplier 20 for the purpose of resetting the oscillator 18 and the flip flop circuits 22. Thus, each time an f3 pulse is received the oscillator and flip flops are reset. After reset the oscillator 18 initiates a cycle of operation producing a pulse output at a frequency designated f4 on line 30. f4 is also provided internally to gate 26 for a purpose to be described.

Signal f4, the oscillator output, is provided to the programmable divider 32 which, depending upon the condition of its programming inputs P1 through P8, divides the frequency f4 down to produce a new frequency, f9, on line 34. Frequency f9 is referred to in the referenced patent as the "ABCD CLOCK" signal and is applied as an input to the oscillator divide circuit 24. Oscillator divide circuit 24 is a selectable dividing circuit which divides the "ABCD CLOCK" input according to the logic state of the pins X and Y.

Truth table 36 indicates the resulting division according to the state of pins X and Y. It will be observed that oscillator divide circuit 24 can divide the incoming frequency by 1, 3, 4 or 6. When the circuit is monitoring speed, division by one is utilized. When the circuit is monitoring engine speed and, therefore, it is driving a tachometer gauge the correct number of cylinders must be indicated to the circuit to properly calibrate the device. Accordingly, division by 3, 4 or 6 is necessary depending on whether the engine being monitored is an 8, 6 or 4 cylinder engine, respectively. The system as thus far described is capable of operation over a wide range of frequencies but for purposes of discussion the oscillator frequency f4 is preferably on the order of magnitude of 100 K hertz.

After f4 has been divided by programmable divider 32 and oscillator divider 24 the output from the divider 24 is applied to the flip flops 22 which sequentially produce the A, B+C, C and D pulses. As indicated schematically in FIG. 6 and as described in detail in the aforementioned patent, a complete cycle of operation terminates with the producing of D pulse which is effective for inhibiting the oscillator 18 via line 37. A new cycle of operation is initiated every time a pulse is received at terminal 10 thereby resetting the circuit back to its initial condition. The upper limit of operation of the circuit is the duration of the A pulse, for the circuit cannot be re-triggered by an additional incoming pulse until the A pulse terminates. After generation of the A pulse the circuit can be re-triggered by an incoming pulse and accordingly the D, C, and B pulses will be shortened as the incoming pulse rate increases. Altering the duration of the B, C, and D pulses is effective, as described in the referenced patent, for causing the desired deflection in the gauge pointer.

Gate 26 receives the oscillator frequency f4 on line 38 and provides an output frequency f10 to a divider 40 only during the period of time that the A pulse is produced from flip flops 22. Gate 26 inhibits the oscillator output to divider 40 during the B, C and D pulses. Pulse frequency f10 is the odometer oscillator frequency when the circuit is used for measuring speed and distance. Alternately, when the circuit is used for measuring engine speed the frequency f10 is used for incrementing an odometer-like counter indicative of thousands of engine revolutions. Divider 40 is a fixed divider. Typically, it is a divide by 128 circuit and provides an output to a second divider 42 which is an odometer calibration divider. This divider may be similar to the programmable divider 32 but is preset at the factory for the units to be sensed, i.e., miles, revolutions, kilometers. The output of the divider 42 is provided to the solenoid driver 44 which operates the solenoid coil 46 to index a typical ratchet and pawl odometer.

As indicated, the odometer (not shown) measures cumulative mileage (or kilometers) or thousands of revolutions if included in a tachometer circuit. It usually comprises a bank of dial indicator wheels indexed by means of a ratchet and pawl operated by solenoid 46. Each pulse indexes the lowest value indicator by one-tenth of a revolution corresponding to a tenth of a mile (kilometer) or 100 revolutions in the case of a tachometer. Thus, the lowest value wheel requires ten pulses per mile or per thousand revolutions, respectively, and this permits scaling of the various dividers in the system so that the transducer input applied to terminal 10 can be appropriately scaled for the odometer.

The transducer pulses at terminal 10 come from the vehicle and consist of pulses generated by a timing wheel operating synchronously with a wheel in the case of a speedometer or the engine in the case of a tachometer. Typical pulse rates are 16,000 pulses per mile or approximately 10,000 pulses for a kilometer for a speedometer. For a tachometer the pulse rate is equal to the number of teeth in the timing wheel (typically 16) times the number of timing wheel revolutions per thousand engine revolutions.

It should be noted that an important feature of the present invention is that once the initial divider values have been selected so that the odometer and speedometer are correctly calibrated the odometer and speedometer are maintained in calibration without the need for separate adjustment. Stated differently, necessary adjustments to calibrate the system are accomplished by means of programmable divider 32 and this adjustment simultaneously correctly calibrates the speedometer and odometer pulse rates.

The programmable divider 32 is preset to a desired value by means of the programmable pins 1 through 8. Selected ones of these pins are connected through a receptacle 48 to signal ground 50. Which of the pins are connected to ground is determined by the mechanical key 52 which is provided with a plurality of removable teeth 54. If left in position these teeth connect a given pin to ground when the key 52 is inserted into the receptacle 48. Removal of the teeth leaves a given programming input open and in this manner an eight bit code is provided to the divider effective for programming it in a manner now to be described so that the divider can be programmed to divide the f4 frequency by a selected integer.

Figure 2:
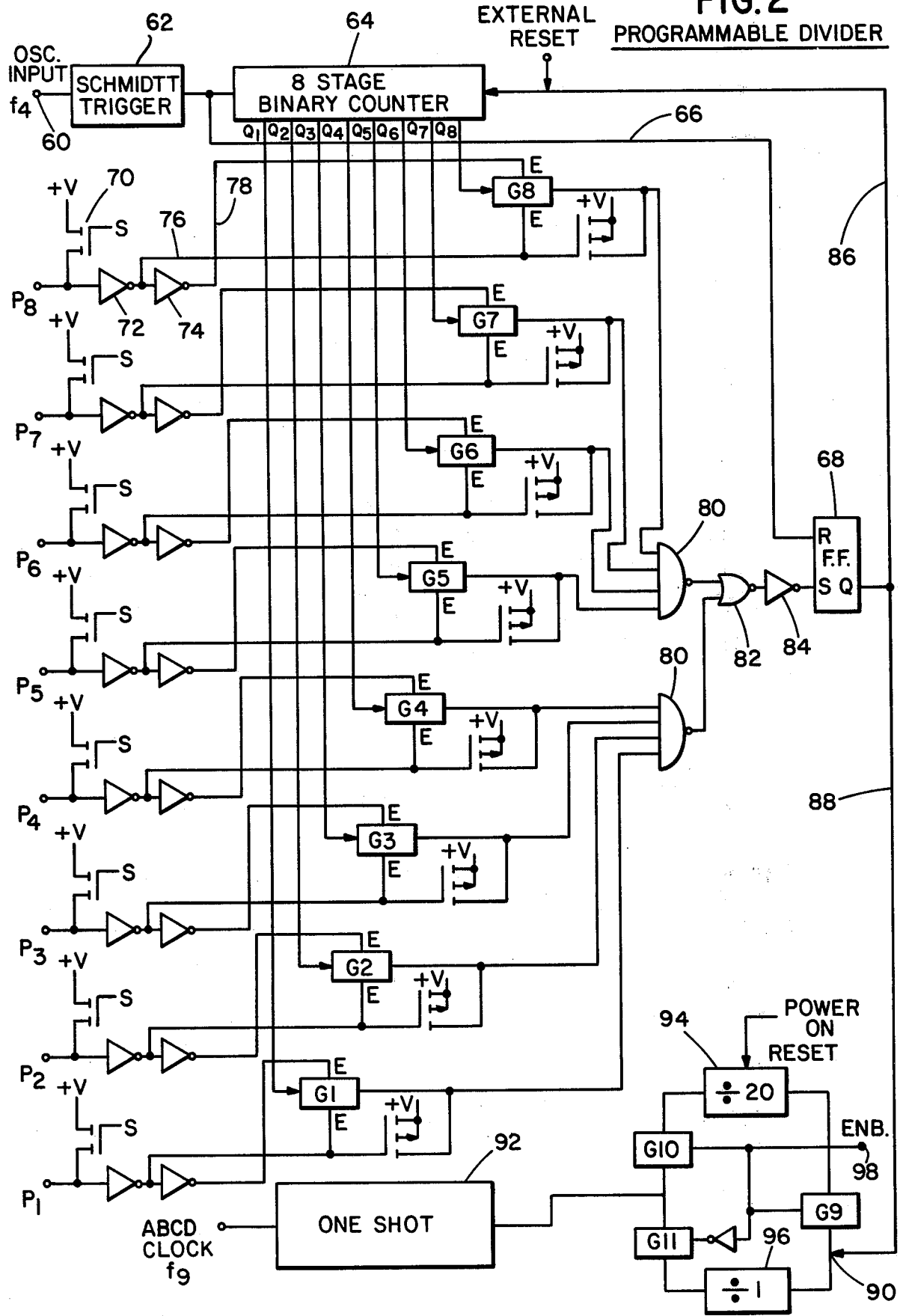
FIG. 2 is a schematic of the programmable divider according to the present invention.

Referring to FIG. 2, the programmable divider 32 according to a preferred embodiment of the invention is illustrated. The input from oscillator 18 is received at terminal 60 where it is shaped and squared by Schmidt trigger 62. The output of the Schmidt trigger circuit is provided to an eight stage binary counter 64 and via line 66 to the reset input of flip flop 68. The outputs of the eight stage binary counter, designated Q1 through Q8, are provided to a matrix of bi-lateral transmission gate switches designated G1 through G8. These switches are of a commercially available type, such as those manufactured by RCA under the designation CD4016. These switches, sometimes referred to as transmission gates, permit an input to pass through to an output line whenever the control lines associated therewith are enabled. In this application gates 1 through 8 have the outputs of the binary counter 64 applied thereto as the signal input. The control lines carrying the designation E and $\overline{E}$ are connected to the programming terminals P1 through P8 via a pull up "P channel" field effect transistor and two logic inverters for operating the associated transmission gate. Thus, for example, terminal P8 employs transistor 70 and logic inverters 72 and 74 for operating the control lines 76 and 78 associated with gate G8. Thus, when terminal P8 is grounded the transmission gate G8 will permit an output on line Q8 of the binary counter to pass through to the upper NAND gate 80. A similar statement is true for gates G1 through 7 and programmable inputs P1 through 7. The output of the NAND gates 80 is provided to NOR gate 82 and via inverter 84 to the set input of flip flop 68. The Q output of flip flop 68 is provided via line 86 to the reset input of the binary ripple counter and via line 88 to terminal 90. At terminal 90, depending upon which of transmission gates G9, G10 and G11 are operated, the output will be divided by one or by 20 and then applied to trigger a one shot 92. The output of the one shot 92 is the ABCD CLOCK signal f9.

Operation of the circuit of FIG. 2 should be apparent from the foregoing description. However, a brief review is believed useful. Depending upon the vehicle to which the system is installed, a proper divisor is selected and programmed into the circuit of FIG. 2. For example, the programmable divider may be set to divide by 192. Thus, for every 192 oscillator pulses one pulse will be produced from the programmable divider. In order to program the divider to divide by 192, inputs P7 and P8 would be grounded by means of the key 52 and receptacle 48. Grounding these pins permits the outputs Q7 and Q8 to pass transmission gates G7 and G8 and operate the flip flop 68. Since binary counter 64 is a ripple counter each of its outputs Q1 through Q8 represents a corresponding power of two, that is, Q1 represents, $2^0$, Q2 represents $2^1$ while Q8 which represents $2^7 = 128$. By grounding pins P7 and P8 the flip flop 68 will be set only when the eight stage binary counter has a count of Q7+Q8 (128+64=192). It will be apparent that all inputs to the gates 80 are at a logical one except for the inputs corresponding to pins that are grounded. If P7 and P8 are grounded then the G7 and G8 inputs to the NAND gate 80 will be low until the counter 64 reaches 192. The gate 80 then sets flip flop 68. Other divisor values are selected by changing the pins which are grounded. It will be readily apparent, therefore, that the programmable divider illustrated in FIG. 2 is capable of division by any selected integer from 1 through 255 plus the added capability of the divide by 20 circuit 94.

The output from the flip flop 68 is used to reset the binary counter 64 in preparation for another cycle of operation and also to trigger one shot 92 via the divide by 20 circuit 94 or the divide by 1 circuit 96 as required for a given application. The value of the signal on terminal 98 determines which of the divider circuits 94 and 96 passes the signal to the one shot 92.

Referring to FIG. 7, a wave form diagram of the operation of the circuit of FIG. 2 is illustrated. Wave form 100 is a series of square wave pulses indicative of the signal applied to terminal 60 of the divider. Wave form 102 is the resultant wave form produced when terminal P4 is grounded and the divide by 20 circuit 94 is not used. Under those conditions an output is produced from one shot 92 after eight input pulses are received by the binary counter 64. The duration of the output pulse is, of course, a function of the time constant set for the one shot 92 and may be changed by changing the external resistor and capacitor values. Wave form 104 illustrates a similar output from the one shot wherein terminal P1 is grounded and the divide by 20 circuit 94 is enabled. Under these circumstances an output is produced after the twentieth pulse is received. Of note in operation of this circuit is that when the divide by 20 circuit 94 is not used the one shot is triggered off the trailing edge of the flip flop output. However, when the divide by 20 circuit is utilized the one shot is triggered off the leading edge of the pulse.

Returning to the example wherein one output pulse is produced for every 192 oscillator pulses the resultant output pulse is applied to the oscillator divide circuit 24. Circuit 24 output increments the flip flop circuit 22 to produce the A, B, C and D pulses. It should be noted that each pulse produced by the flip flops will be some multiple of 192 pulses since the output of the flip flops only changes when a pulse is provided from the programmable divider 32. Thus, referring to FIG. 6, it will be observed that the A pulse is 192 pulses wide, the B pulse is 192 pulses, the C pulse is 384 pulses.

Recalling that the odometer pulses produced from the gate 26 occur only during the A pulse interval, it can be readily understood that by adjustment of the programmable divider 32 to re-calibrate the speedometer, the odometer is simultaneously re-calibrated for the new operating conditions. For example, if a change in tire size requires that the output pulse from the programmable divider be produced every 191 pulses rather than every 192 pulses, the output from the gate 26 would be similarly decreased since the duration of the A pulse interval from the flip flop 22 would be shortened.

Figure 3:
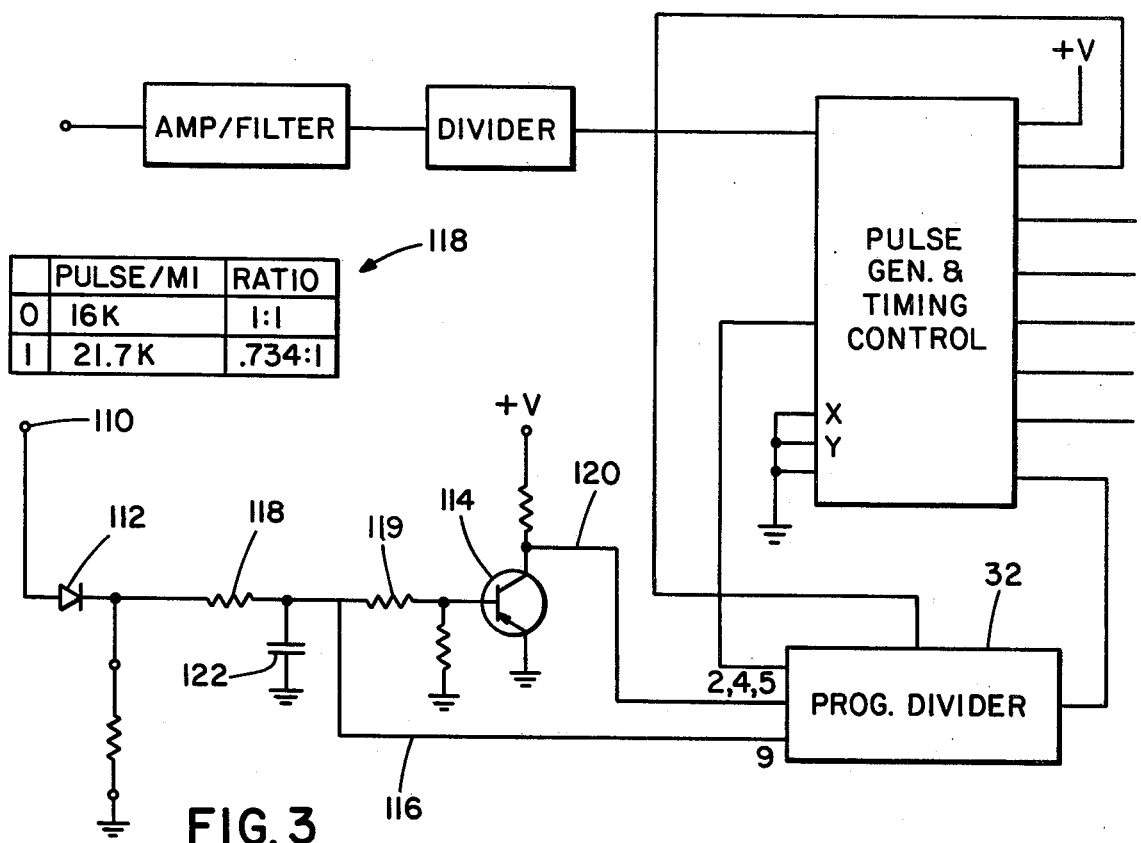
FIG. 3 is a circuit similar to FIG. 1 in which the programmable divider is switched between two selected values when a condition, such as truck overdrive, is sensed.

Referring now to FIG. 3, a circuit according to a second embodiment of the invention is disclosed. This embodiment differs from the FIG. 1 circuit in that the method of operating the programmable divider 32 is suited for use on trucks having an overdrive feature. The portion of the circuit indicated schematically in FIG. 3 is capable of detecting overdrive and switching the divisor value in the divider 32 to correctly compensate for the change in axel ratio of the truck. A binary signal, the state of which is representative of normal operation or overdrive, respectively, is applied to terminal 110. Via diode 112 and biasing resistors the signal is applied to control the base of transistor 114. The emitter of this transistor is grounded while the collector is connected through a pull up resistor to a source of voltage and also to selected ones of the pins P1 through P8 depending upon the desired divisor. Line 116 connected to the midpoint of resistors 118 and 119 is also connected to a selected one or more of the P inputs of the divider. Line 116 is connected to ground when there is no charge on capacitor 122.

As indicated by the truth table 118, when terminal 110 is grounded transistor 114 is cut off maintaining line 120 at a positive voltage. Under these circumstances the P inputs connected to line 120 are inhibited and have no effect on the selection of the divisor. Instead, line 116 which is at ground enables selected inputs of the divider. This condition may correspond to overdrive conditions in which the gear ratio is approximately 1 to 1. Typically, under these circumstances the circuit will receive approximatey 16,000 pulses to the mile. Under normal or standard operation the gear ratio changes to approximately 0.73 to 1 and the pulses per mile produced by the transducer increase to approximately 22,000. When normal or standard operation is employed this condition is detected by any suitable means and a positive voltage is applied to terminal 110. This charges capacitor 122 inhibiting the inputs connected to line 116. However, transistor 114 is now saturated grounding line 120 thereby enabling the P inputs connected thereto. In this manner a switchable divider is provided which automatically changes its divisor value to correspond with the change in gear ratio between standard truck operation and overdrive. A significantly more accurate speedometer reading is obtained with the concomitant accuracy improvement of the odometer readings. The remaining portions of the FIG. 3 circuit are identical to the circuit of FIG. 1 and need not be further described.

Figure 4:
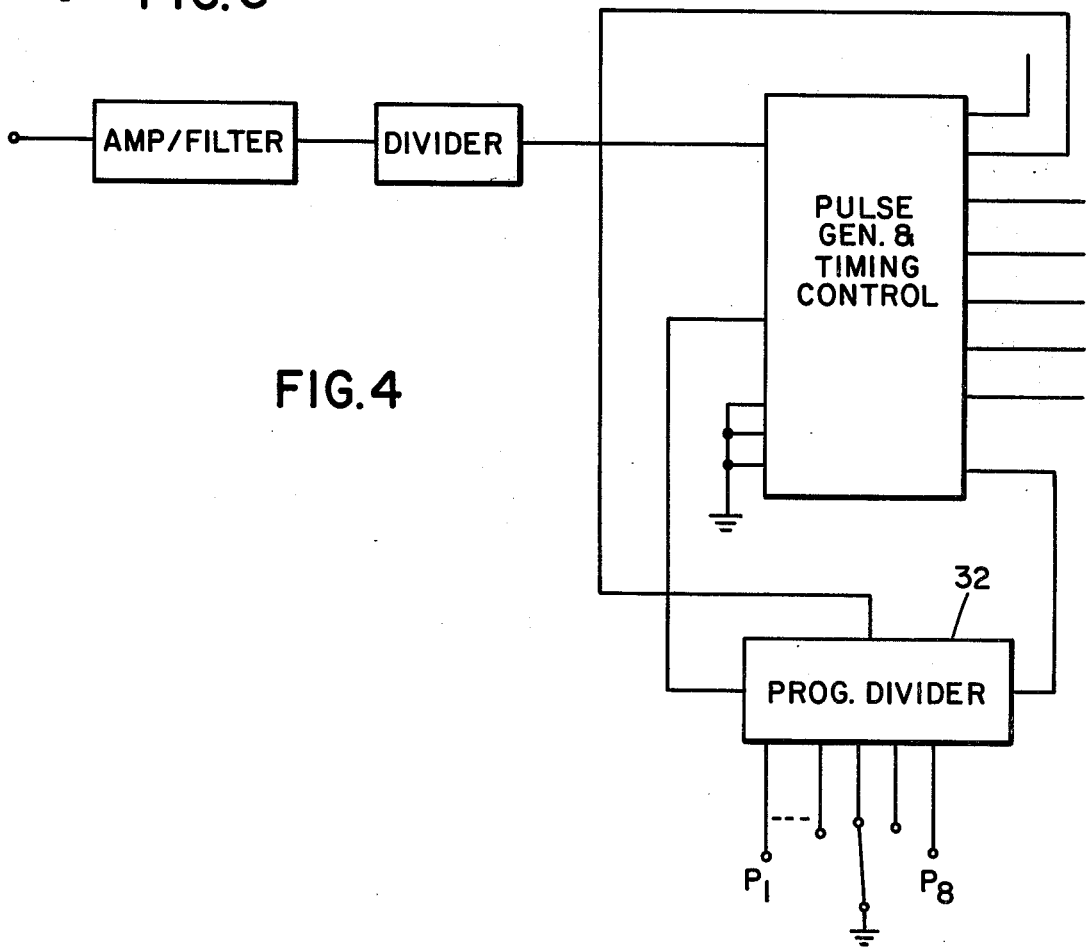

FIG. 4 discloses a third embodiment of the invention in which the programmable divider 32 is switch selectable so that various divisors may be employed. In lieu of the programming means disclosed in FIG. 1, where the same change is often encountered, a switch may be provided to change the divider. In such case the switch merely grounds one or more appropriate P input terminals to the divider as necessary for the application. The remaining portion of the FIG. 4 circuit is identical to the circuit disclosed in FIG. 1.

Figure 5:
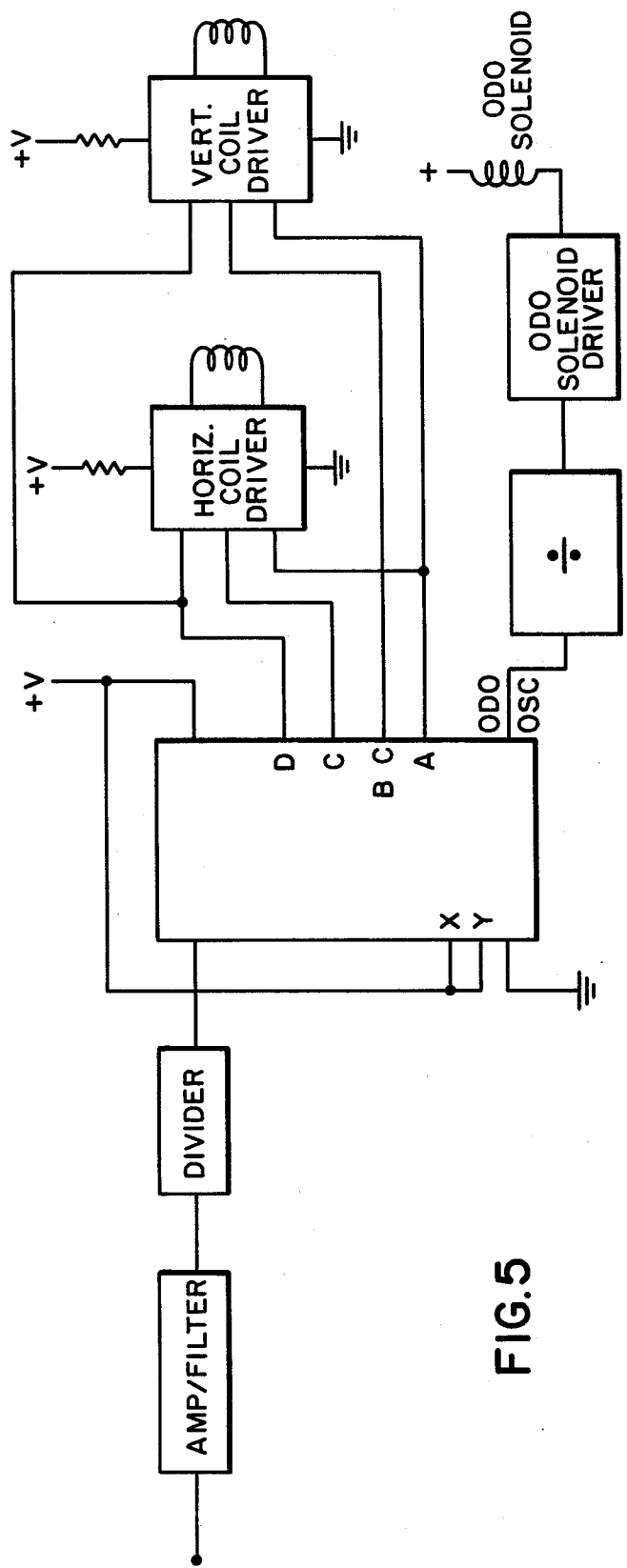
FIG. 5 is a fourth embodiment of the invention suitable for use in a passenger automobile wherein a programmable divider is not required.

FIG. 5 is a fourth embodiment of the invention and relates to the special case when it is not necessary to recalibrate the circuit after installation in a vehicle. Typically, this would occur where the circuit is used for passenger automobiles rather than commercial or farm vehicles. In such a case the programmable divider 32 is omitted and the oscillator output is provided directly to the oscillator divide circuit 24 for driving the flip flops 22 to produce the timing pulses.

Referring to FIG. 6, a hybrid wave form circuit diagram is presented which indicates the flexibility of the system to accommodate speedometers and tachometer and to calibrate a wide range of applications. The A, B+C, C and D pulses are illustrated in their proper time relationship to operate the air core gauge. The odometer oscillator pulses are illustrated as being generated only through the A pulse duration and the X and Y inputs to the oscillator divide circuit 24 are indicated.

While I have shown and described embodiments of this invention in some detail, it will be understood that this description and illustrations are offered merely by way of example, and that the invention is to be limited in scope only by the appended claims.

I claim:

1. A programmable circuit for driving the magnetic deflection circuits of a rate measuring gauge, such as a speedometer or tachometer, and a related odometer circuit responsive to received electrical pulses representative of detected movement comprising:
   (a) logic means for applying current to said deflection circuits in a selected sequence to cause said gauge to provide an indication of the rate of the detected movement being sensed,
   (b) means for clocking said logic means through said selected sequence at a predetermined clock frequency each time one of said electrical pulses is received,
   (c) means programmable by the user for altering the output from said clocking means to calibrate said gauge to accurately represent the rate of movement being sensed,
   (d) said logic means including gate means for automatically maintaining said odometer unit in calibration with said rate measuring gauge.

2. The circuit according to claim 1 wherein said clocking means is a fixed frequency resettable oscillator.

3. The circuit according to claim 2 wherein said logic means includes flip flops and means gating said flip flops to produce said selected sequence and to inhibit operation of said oscillator after at least a portion of said sequence has been produced.

4. The circuit according to claim 1 wherein said programmable altering means includes a divider for dividing said clock frequency by an integer, said divider having at least three programming inputs, for selecting the integer used as the divisor.

5. The circuit according to claim 4 wherein said divider is capable of division by any integer from 1 to 255.

6. The circuit according to claim 1 wherein said programmable altering means includes a divider circuit including:
   (a) a multiple state ripple counter incremented by the output from said clocking means and having an output for each stage thereof,
   (b) gating means receiving the output of each counter stage,
   (c) means for enabling selected ones of said gating means, the value of the divisor being determined by selecting which of said gating means are enabled, and
   (d) means for producing an output signal only when an output is received from all counter stages whose corresponding gating means have been enabled.

7. The circuit according to claim 6 wherein said enabling means includes:
   (a) a program input terminal for each gating means,
   (b) means for connecting each of said program input terminals to one of two voltage levels, one of said levels enabling said gating means.

8. The circuit according to claim 7 wherein said connecting means includes:
   (a) a key having a plurality of removable electrically conducting teeth,
   (b) a receptacle to which said program input terminals are connected and adapted to receive said key, each of said teeth, if not removed, effective for connecting one of said terminals to the enabling voltage level whereby the value of the divisor can be programmed by selecting the configuration of the teeth of said key.

9. The circuit according to claim 7 wherein said connecting means includes:
   means for changing the combination of said input terminals connected to said enabling voltage responsive to detecting a change in the relationship of the detected movement to said received electrical pulses.

10. The circuit according to claim 9 wherein said changing means is a switching circuit for switching between at least two combinations of said input terminals depending upon the value of a voltage applied to said switching circuit.

* * * * *